(12) United States Patent
Yang et al.

(10) Patent No.: US 6,600,245 B1
(45) Date of Patent: Jul. 29, 2003

(54) VIBRATION MOTOR

(75) Inventors: Woo Seok Yang, Suwon-shi (KR);
Byoung Hown Han, Suwon-shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/163,795

(22) Filed: Jun. 5, 2002

(30) Foreign Application Priority Data

Mar. 22, 2002 (KR) ........................................ 2002-15597

(51) Int. Cl.[7] ................................................. H02K 5/22
(52) U.S. Cl. ............................ 310/71; 310/89; 310/91
(58) Field of Search ............................... 310/71, 91, 89

(56) References Cited

U.S. PATENT DOCUMENTS 5,192,888 A * 3/1993 Fleer ........................... 310/71
5,872,410 A * 2/1999 Sudoff ....................... 310/68 R

* cited by examiner

Primary Examiner—Nestor Ramirez
Assistant Examiner—Leda Pham
(74) Attorney, Agent, or Firm—Darby & Darby

(57) ABSTRACT

Disclosed is a vibration motor having a connector header coupled to an outer face of a housing via welding to maintain a securely fixed position even under external impact or dropping.

14 Claims, 8 Drawing Sheets

VIBRATION MOTOR

BACKGROUND OF THE INVENTION

1. Field of the Invention

The present invention relates to a coin-type vibration motor mounted inside a mobile communication device such as a mobile telephone to be used as call-receiving means, and more particularly to a vibration motor capable of improving the assemblage efficiency of a connector header to maintain a securely fixed position.

2. Description of the Prior Art

In general, one of inevitable functions for a mobile communication terminal is a call-receiving function. The call-receiving function indicates call-receiving most frequently via a melody mode for producing sound and a vibration mode for shaking the terminal. In other words, if a user previously selects a mode necessary for call-receiving, the selected mode operates at the tie of call-receiving to allow the user to detect call-receiving.

In the above call-receiving modes, the vibration mode i s generally used for allowing others to keep from noise in a place crowded with people. In general, the vibration mode drives a small-sized vibration motor to transfer a vibrating force into a housing of the terminal so that terminal may vibrate.

In the meantime, a vibration mode conventionally in use is driven by a vibration motor which is additionally mounted inside the terminal. Examples of the most representative vibration motors include a so-called pan cake-type or coin-type vibration motor which has an external configuration with the diameter relatively larger than the thickness as shown in FIGS. 1 and 2.

A vibration motor configured as above is provided at the bottom with a plate-shaped lower housing 100 having a tubular burring section 100a which is projected for a certain height in a central section of the lower housing. The tubular burring section 100a has a shaft hole in the center so that the lower end of a shaft 140 is fixed through interference insertion. To the upper face of the lower housing 100 is attached a lower board 110 having a printed circuit to which external power can be applied and a terminal section 110a projectedly extended beyond an upper housing.

To the upper outer circumference of the lower housing 100 having the lower board 110 attached thereto as above, is provided a ring-shaped magnet 130 which has a vertically perforated space at the center and N and S poles alternatingly magnetized along the circular circumference thereof with the same interval.

In the lower board 110 provided under the perforated central space of the magnet 130, a pair of brushes 120 are spaced with a predetermined angle from each other, and have one ends respectively connected to input and output terminals of the lower boards 110 and the other ends positioned higher than the upper face of the magnet 130.

In the meantime, to the outer circumferential end of the lower housing 100 is coupled a cylindrical upper housing 150 for covering the lower housing 100 from the upside. The upper housing 150 is configured to axially support the upper end of a shaft 140 which has the lower end axially supported in the lower housing 100.

The shaft 140 supported to the lower housing 100, the lower board 110, the magnet 130, the pair of brushes 120 and the upper housing 150 constitute a stator in the vibration motor. A rotor 200 is installed rotatable about the stator, and comprises an upper board 210, a commutator 220 and wound coils 240.

The upper board 210 is a printed circuit board supported to the shaft 140 and a bearing b in an eccentrically rotatable fashion. The upper board 210 is integrally provided in a face opposed to the lower housing 100 with the commutator 220 constituted of a number of segments. For electric conduction, the segments contact to the upper ends of the pair of brushes 120 with the lower end connected to the lower board 110.

The wound coils 240 are attached to the upper face of the upper board 210 where a circuit is not printed. Although two wound coils 240 are provided as shown in FIG. 2, one wound coil may be alternatively provided due to a driving mode of the vibration motor. In particular, if at least two wound coils are provided, the coils are spaced from each other with a predetermined angle.

Further, the upper board 210 to which the wound coils 240 are not attached is integrally provided with an insulator 250 for insulation between the wound coils 240 and increase of eccentric load. Through insert injection, the insulator 250 is formed integral with the commutator 220 and the wound coils 240 which are attached to the upper board 210 during manufacture thereof. Between the adjacent pair of wound coils 240 is provided a weight having a high specific gravity for maximizing the amount of eccentricity.

The conventional vibration motor configured as above has a connector header 300 electrically connected to the terminal section 110a of the lower board 110. The connector header 300 has a substantially rectangular configuration with one circular face for closely contacting to the outer circumference of the upper housing 150.

The connector header 300 is attached to the outer circumference of the upper housing 150 via adhesive t, and constituted of a body 300a having an opened configuration at the upper and both sections and a pair of terminals 310 and 320 installed inside the body 300a. The terminals 310 and 320 have circularly bent structures so that the upper ends elastically project upward.

The conventional vibration motor configured as above is applied with electric current as the terminals 310 and 320 of the connector header 300 connect to an external system board (not shown). Current is induced into the commutator 220 via the brushes 120 of the lower board connected to the connector header 300. The commutator 220 transfers current into the wound coils 240 along the printed circuit on the upper board 210. Then, a magnetic flux generated from the wound coils 240 reacts with a magnetic flux generated from the magnet 130 to produce an electromagnetic force thereby rotating the rotor 200.

In this case, the rotor 200 is eccentrically supported to the shaft 140 so as to realize an eccentric drive. This causes an eccentric driving force to be transferred to the lower housing 100 and the upper housing 150 via the shaft 140 incurring vibration. This is utilized as silent call means of the mobile communication terminal.

However, in the above vibration motor of the prior art, the connector header 300 has the configuration to be simply fixed to the outside of the upper housing 150 via adhesive t. The connector header 300 may be easily played or detached from the upper housing 150 rather than maintaining a securely fixed position under external impact or dropping. Further, the terminals 310 and 320 which are mounted inside the connector header 300 and outwardly projected at one ends are not provided with any specific support structure. Thus, the terminals 310 and 320 may be easily deformed to cause contact defect under impact.

SUMMARY OF THE INVENTION

Accordingly the present invention has been made to solve the above problems of the prior art and it is an object of the invention to provide a vibration motor, in which a connector header is coupled to an outer face of a housing via welding to maintain a securely fixed position even under external impact or dropping.

It is another object of the invention to provide a vibration motor, in which terminals provided in a connector header can be restored to the initial positions even under external force to enhance the reliability of an article.

According to an aspect of the invention to obtain the above objects, it is provided a vibration motor comprising: a lower housing with a rim portion bent into the shape of a disk to form a flange; an upper housing inserted around the flange of the lower housing and covering an upper portion thereof to form an inner space; a lower board coupled to an upper face of the lower housing, the lower board having one end extended parallel beyond the lower housing to form a terminal section and an upper face connected to one ends of brushes; a magnet provided over the lower housing adjacent to an outer circumference of the lower board; an upper board rotatably supported to a shaft connecting between central sections of the lower and upper housings, and integrally provided at a lower face with a commutator selectively contacting to the brushes for electric conduction; a plurality of wound coils provided at an upper face of the upper board; an insulator made of resin provided at the upper face of the upper board for integrally fixing the wound coils and the upper board; a connector header provided in an outer face of the upper housing, and having terminals for applying external electric current to the terminal sections of the lower board; and a fixing bracket with a central section fixed in position inside the connector header and both ends bonded to the outer face of the upper housing via welding.

Preferably, the connector header comprises a fixing rib projected from a lower portion of the connector header toward a bottom of the lower housing and provided at one end with a fitting protrude which is elastically inserted into a gap formed between the flange of the lower housing and the inner circumference of the upper housing.

Preferably, the fixing rib is provided in plurality with an interval.

Also preferably, the fixing rib is integrally formed with the connector header via injection.

Preferably, the fixing bracket is bonded to the outer face of the housing via spot welding.

Preferably, the fixing bracket is made of sheet metal.

Preferably also, the connector header comprises: a pair of bilaterally symmetric terminals with one ends electrically connected to the terminal section of the lower board and the other ends forming elastic inserting sections which are bent projectedly in one lateral direction after upwardly extended and contacts extended again from the inserting sections and circularly bent upward; and a body for fixedly receiving the pair of terminals therein, the body having inserting grooves for elastically receiving the inserting sections of the terminals and connecting grooves provided at upper portions for connecting between the inserting grooves and the outside to outwardly project the contacts of the terminals.

DETAILED DESCRIPTION OF THE PREFERRED EMBODIMENT

The following detailed description will present a preferred embodiment of the invention in reference to the accompanying drawings.

Figure 1:
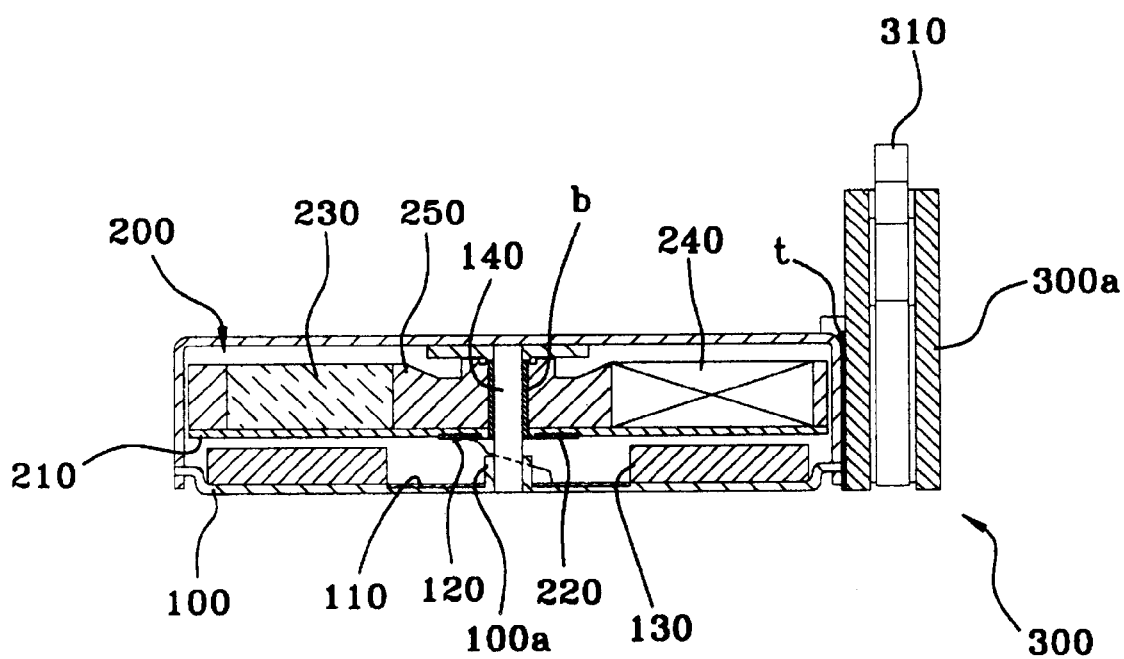
FIG. 1 is a sectional view illustrating the structure of a vibration motor of the prior art.
Figure 2:
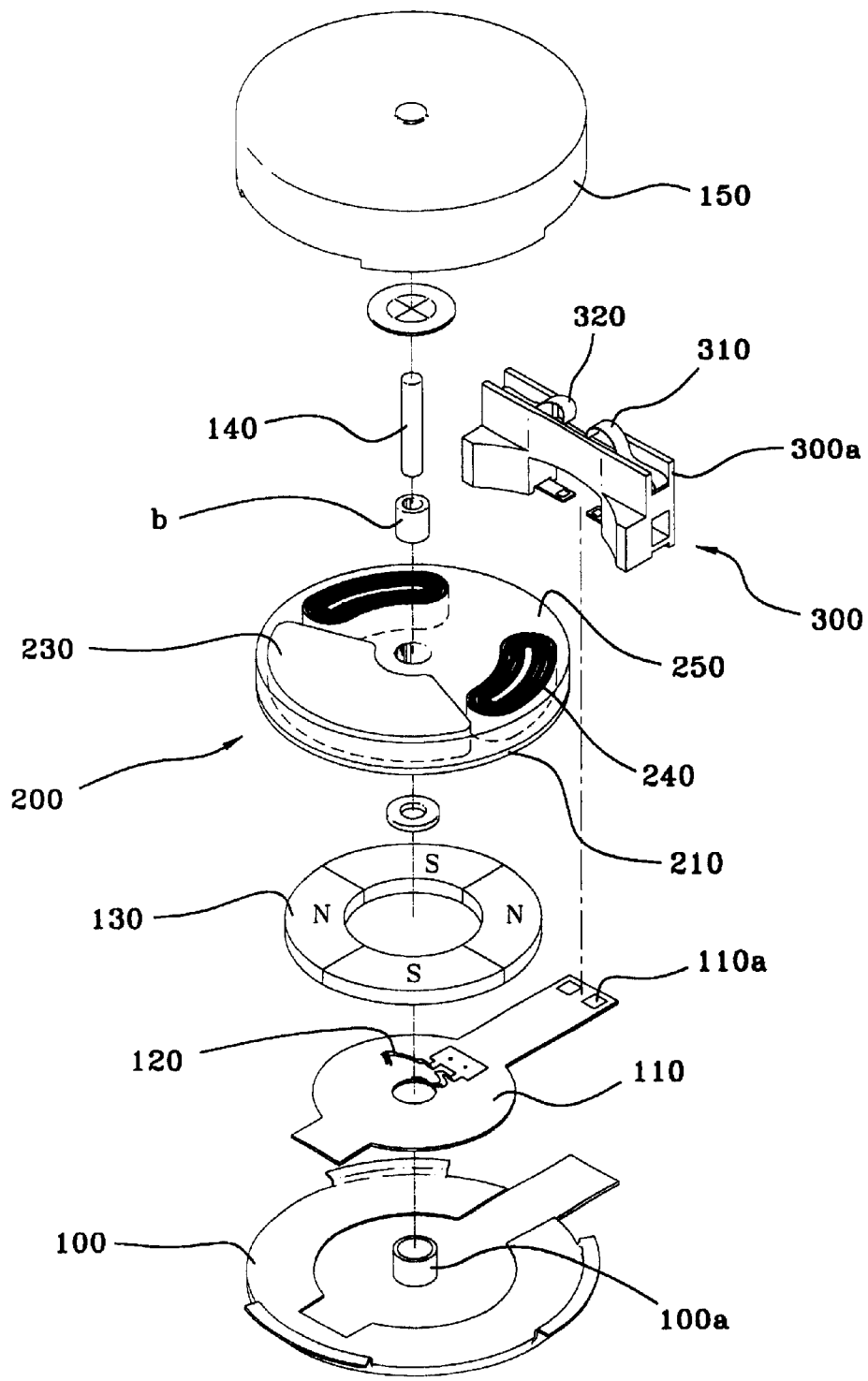
FIG. 2 is an exploded perspective view illustrating the vibration motor shown in FIG. 1.
Figure 3:
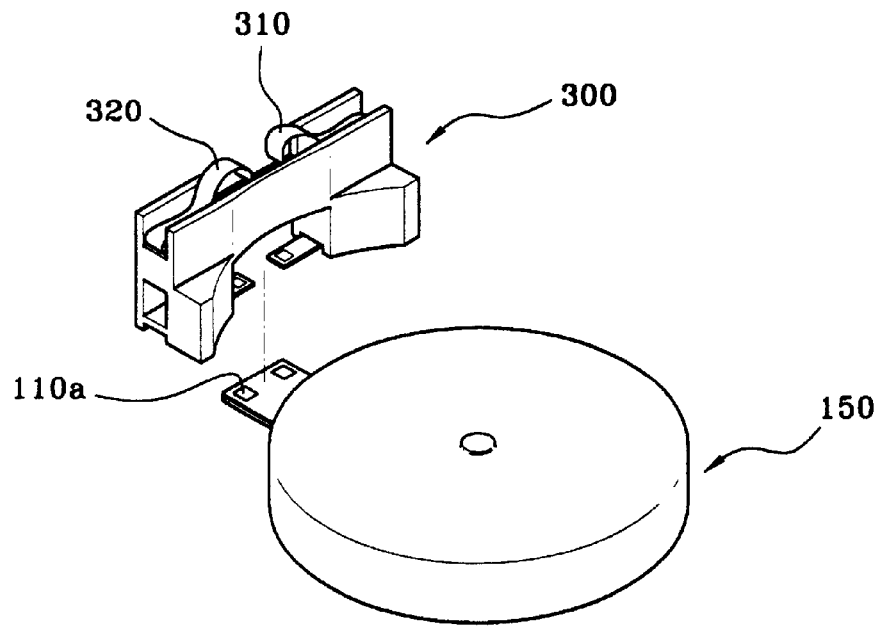
FIGS. 3 and 4 are perspective views illustrating the vibration motor of the prior art.
Figure 4:
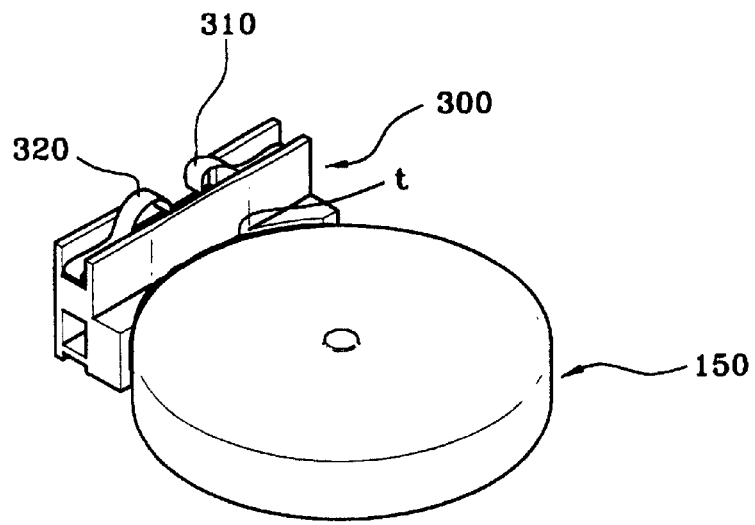
Figure 5:
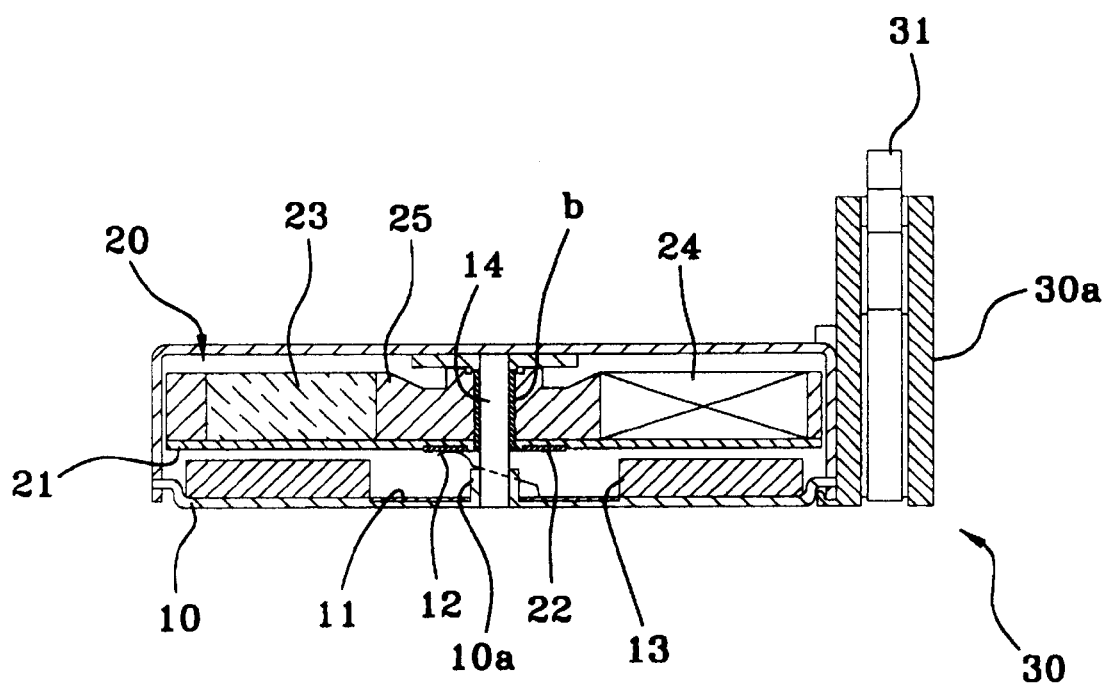
FIG. 5 is a sectional view illustrating a vibration motor of the invention.
Figure 6:
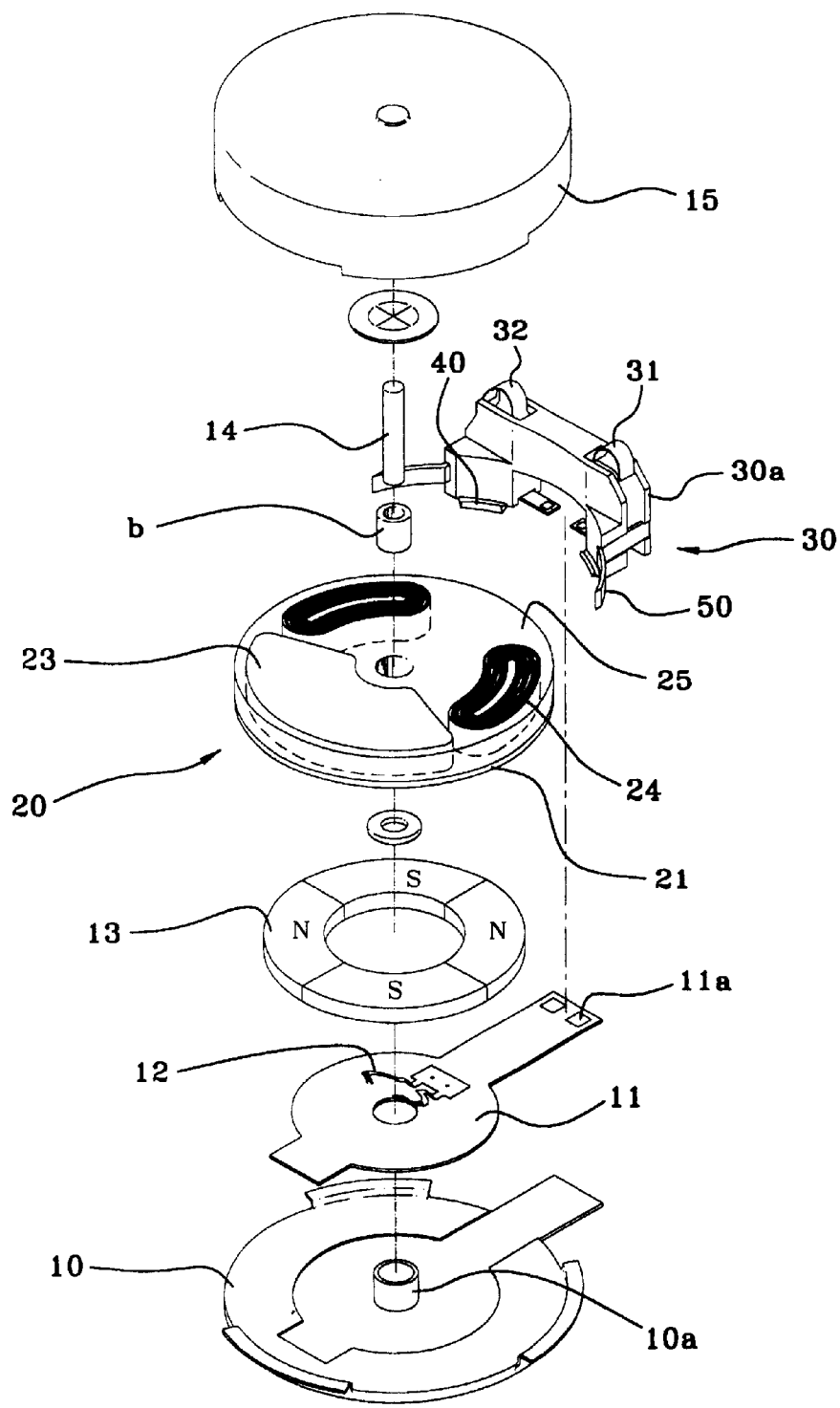
FIG. 6 is an exploded perspective view illustrating the vibration motor shown in FIG. 5.
Figure 7:
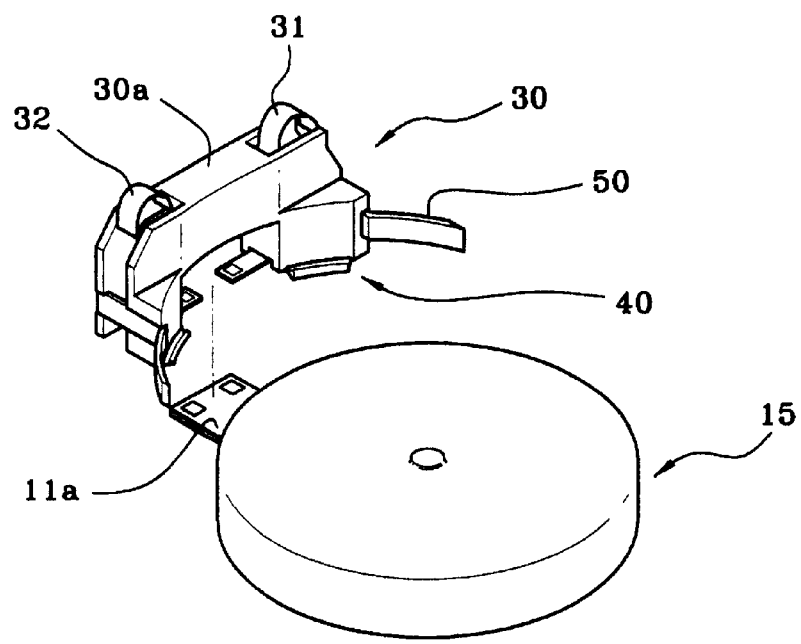
FIGS. 7 and 8 are perspective views illustrating the vibration motor of the invention.
Figure 8:
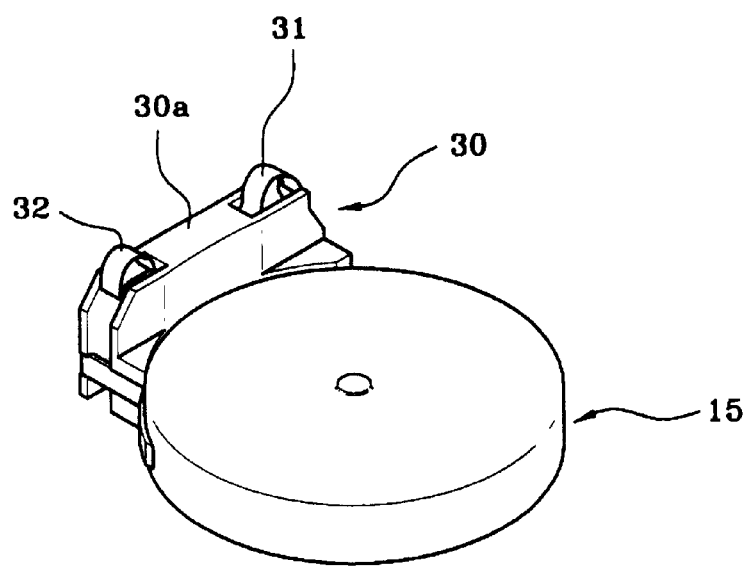

FIG. 5 is a sectional view illustrating a vibration motor of the invention, FIG. 6 is an exploded perspective view illustrating the vibration motor shown in FIG. 5, and FIGS. 7 and 8 are perspective views illustrating the vibration motor of the invention.

Figure 9:
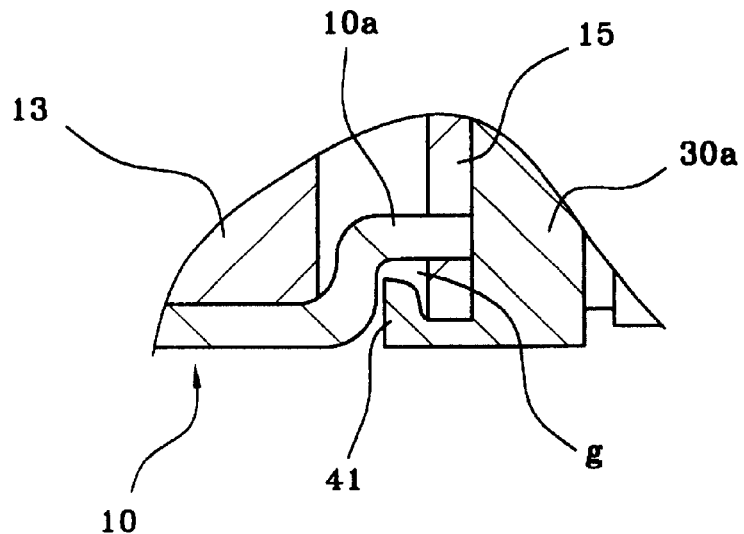
FIG. 9 is a magnification of "A" in FIG. 5.
Figure 10:
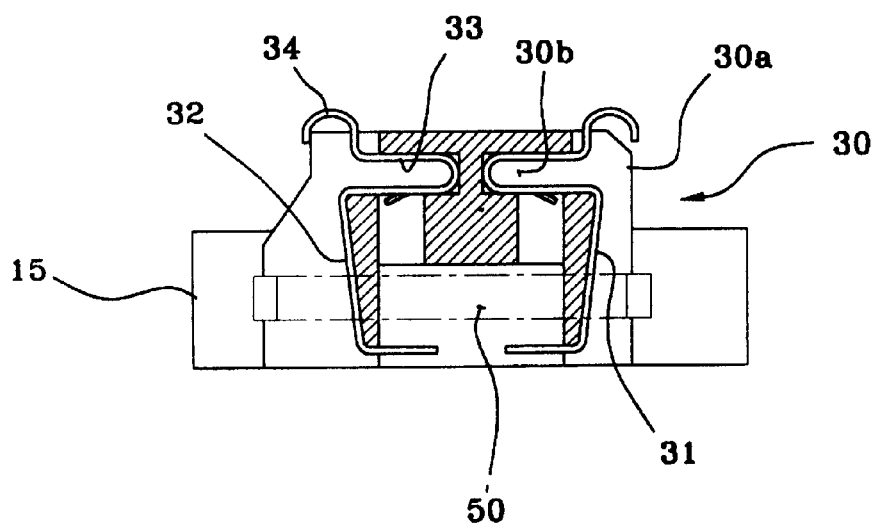
FIG. 10 is a sectional view illustrating a connector header of the vibration motor of the invention.
Figure 11:
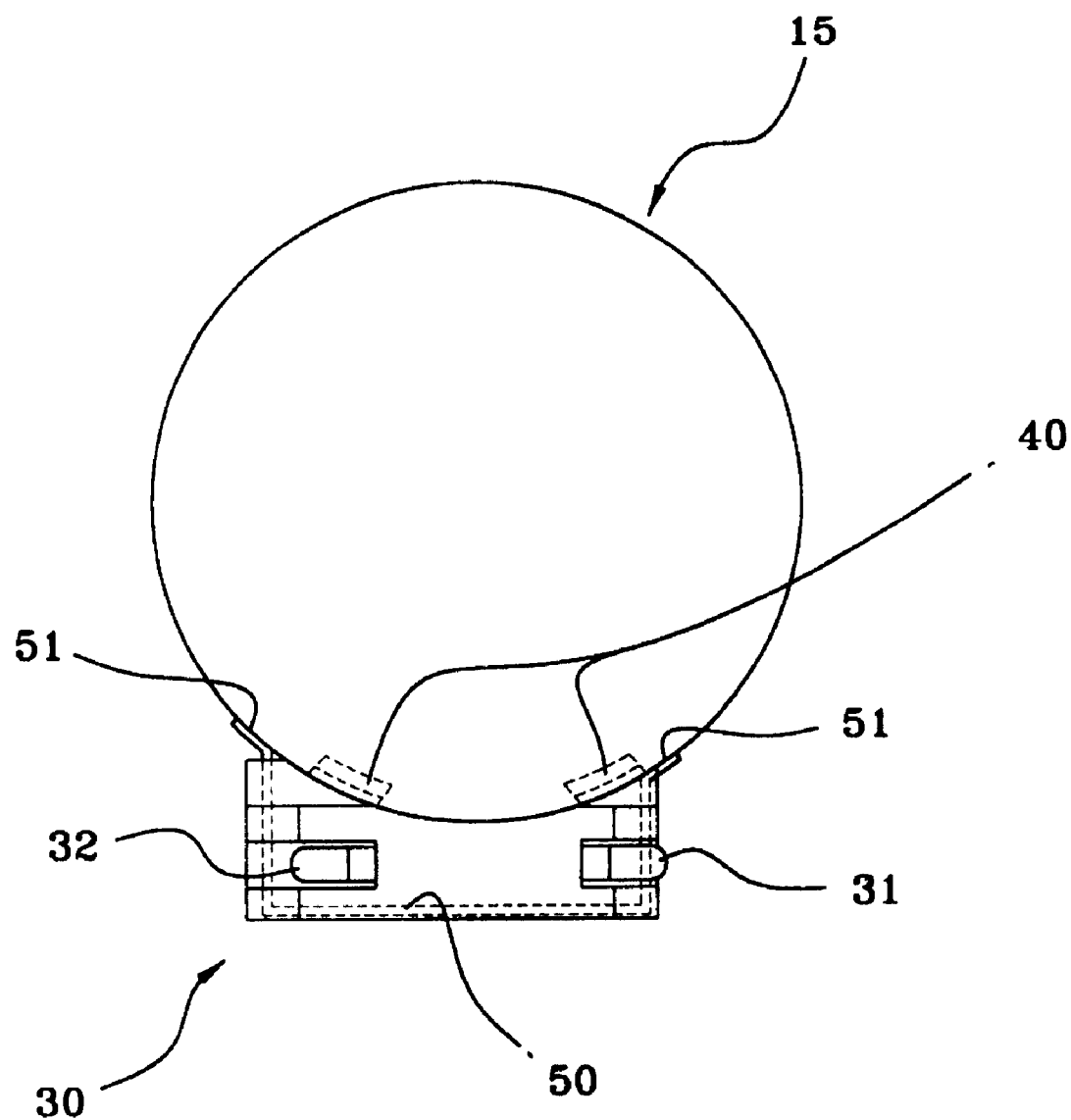
FIG. 11 is a plan view illustrating a connector header of the invention.

FIG. 9 is a magnification of "A" in FIG. 5, FIG. 10 is a sectional view illustrating a connector header of the vibration motor of the invention, and FIG. 11 is a plan view illustrating a connector header of the invention.

As shown in the drawings, the vibration is mainly comprised of a stator, rotor and a connector header 30, in which the stator includes an upper housing 15, a lower housing 10, a shaft 14, a lower board 11, a magnet 13 and brushes 12, and the rotor 20 includes an upper board 21 supported to a bearing b, a commutator 22, wound coils 24, a weight 23 and an insulator 25.

The connector header 30 is applied with current from a board (not shown) of a system mounted with a motor, and transfers current into a terminal section of the lower board 11. The connector header 30 includes a body 30a coupled to the side of the upper housing 15 and a pair of terminals 31 and 32 mounted inside the body 30a.

Hereinafter components of the vibration will be described in more detail as follows.

The upper housing 15 is a substantially cylindrically body opened at the lower face, and has a structure for axially support the upper end of the shaft 14. The opened lower face is covered with the planar lower housing 10.

The lower housing 10 is configured to cover the cylindrical upper housing 15, and has a projected flange 10a which is substantially bent upward at a rim portion. The outer circumference of the flange 10a has the outer circumference substantially same as the inner circumference of the upper housing 15 so that the lower housing 10 and the upper housing 15 are assembled through interference fit.

In the meantime, central sections of the lower housing 10 and the upper housing 15 are connected via the shaft 14 to maintain a securely coupled position. In an upper central section of the lower housing 10 is inserted and bonded a lower board 11 having a printed circuit.

The lower board 11 has one end forming a terminal section 11a which is extended parallel beyond the lower housing 10 and electrically connected to terminals 31 and 32 of a connector header 30 which will be described later. To the upper outer circumference of the lower housing 10 outside the lower board 11 attached thereto as above, is attached a circular magnet 13.

The magnet 13 is alternatingly magnetized with 2n number of N and S poles, i.e. 2, 4, 6 and the like, and preferably with about 2 to 6 N and S poles so that a component constitution may be simplified considering that the number of internal components increases or decreases according to the number of poles of the magnet.

In the meantime, the lower board 11 is provided with the pair of brushes 12 having fixed and electrically connected one end and the other end upwardly extended to contact to a contact face of a commutator 22 which will be described later.

The pair of brushes 12 are spaced from each other for a predetermined angle, in which one of the brushes 12 performs a power input function to transfer current induced via the lower board 11 into the commutator 22, and the other one of the brushes 12 performs a power output function to transfer current induced so the commutator 22 into the lower board 11.

In the meantime, the shaft 14 connecting the central sections of the lower housing 10 and the upper housing 15 rotatably supports the circular planar upper board 21 with the bearing b.

The upper board 21 is printed circuit board eccentrically-rotatably supported to the shaft 14 and the bearing b, and has one face printed with a circuit. On the upper face of the upper board 21 are arranged the plurality of wound coils 24 and the weight 23.

The wound coils 24 and the weight 23 are integrally provided by an insulator 25 for insulation and increase of eccentric load, in which the weight 23 is generally formed of a tungsten ally having a high specific gravity.

The upper board 21 configured as above is integrally provided with the commutator 22 made of a number of segments in the face of the upper board 21 opposed to the lower housing 10, i.e. the outer lower face as seen in the drawings. The commutator 22 generally has the segments 2 numbered in 2 times of the poles of the magnet 13.

The body 30a is manufactured have a substantially rectangular cross section with one face being circularly formed to closely contact to the outer face of the upper housing 15. The body 30a has a pair of terminals 31 and 32 inserted and installed inside the same.

The terminals 31 and 32 have one ends electrically connected to the terminal section of the lower board 11 and the other ends projectedly extended upward to electrically connect to an external system board (not shown).

The configuration as above is similar to that of the conventional vibration motor. However, the invention is characterized in that the connector header 30 as a connector member is more closely and securely fixed to the upper and lower housings 15 and 10 to prevent easy play or detachment due to dropping and external impact.

In other words, the connector header 30 has coupling means for preventing play or detachment from the upper and lower housings 15 and 10 as shown in FIGS. 7 to 11, in which the coupling means is mainly divided into fixing ribs 40 in the shape of an elastic piece and fixing brackets 50 functioning as fixing members.

Each of the fixing ribs 40 is extended from the lower face of the body 30a of the connector header 30 connecting to the outside of the upper housing 15 to the proximity of the flange 10a in the bottom of the lower housing 10, and provided at the end with a fitting protrudes 41 projected upward. In this case, the fitting protrude 41 is so provided to be elastically inserted into a gap g formed between the lower inner circumference of the upper housing 15 and the flange 10a of the lower housing when the upper and lower housings 15 and 10 are coupled.

In the meantime, the above fixing ribs 40 are formed at a predetermined interval from each other, and number in at least two. The fixing ribs 40 are integrally manufactured with the body 30a through injection to have an elastic force in the vertical direction when seen in the drawings.

Each of the fixing brackets 50 is a plate-shaped fixing member having a predetermined length with a central end fixed inside the body 30a of the connector header 30 and both ends extended for a predetermined length beyond the body 30a to form welding sections 51. Generally, the each fixing bracket 50 is made of sheet metal.

The fixing brackets 50 as above are bonded through spot welding as closely contacted to the outside of the upper housing 15. This configuration allows the connector header 30 to maintain the position securely coupled to the upper housing 15.

In the meantime, the invention includes a configuration capable of allowing elastic restoration into the initial height of contacts 34 of the terminals 31 and 32 while avoiding deformation thereof.

In other words, the terminals 31 and 32 are provided as a pair arranged substantially bilaterally symmetric. According to the configuration of the terminals 31 and 32, one ends are electrically connected to the terminal section 11a of the lower board 11 through soldering and the like, and the other ends form elastic inserting sections 33 which are bent projectedly in one lateral direction after upwardly extended and the contacts 34 extended again from the inserting sections 33 and circularly bent upward. In this case, the elastic inserting sections 33 so operate that the circularly bent contacts 34 may be applied with upward and downward elastic forces.

In the pair of terminals 31 and 32 configured as above, the inserting sections 33 are arranged as opposed and so bent to have an elastic force which tends to flare the terminals 31 and 32 in a direction spaced from each other.

In the meantime, the body 30a of the connector header 30, inside which the terminals 31 and 31 are installed, is provided with a pair of inserting grooves 30b for elastically receiving the inserting sections 33 of the terminals 31 and 32 and grooves at upper portions for connecting between the inserting grooves 30b and the outside so that the contacts 34 of the terminals 31 and 32 may project upward.

In this case, the inserting sections 33 of the terminals 31 and 32 are elastically inserted into the inserting sections 33 of the body 30a.

In the terminals 31 and 32 configured as above, only the circularly bent contacts 34 are outwardly exposed from the body 30a as shown in the drawings. Therefore, if an external force acts on the contacts 34, the inserting sections 33 undergo elastic deformation to absorb the external force. When the external force is removed, the contacts 34 can be restored to their initial positions due to elasticity of the inserting sections 33. This prevents deformation of the contacts 34 under the external force.

Describing in more detail effects of the vibration motor of the invention configured as above, the both ends of the fixing brackets are spot welded to the outside of the upper housing as well as the fitting protrudes of the fixing ribs are caught to the gaps defined in assembly of the upper and lower housings so that the connector header can maintain more securely coupled position. This prevents play or detachment of the connector header even under dropping of the vibration motor or external impact thereto thereby advantageously improving the quality of an article.

Further, the inserting grooves in the body apply a predetermined amount of elastic force to the pair of terminals to be elastically restored to their initial positions even under external force thereby enhancing the reliability of the article by a large amount.

What is claimed is:

1. A vibration motor comprising:

a lower housing with a rim portion bent into the shape of a disk to form a flange;

an upper housing inserted around said flange of the lower housing and covering an upper portion thereof to form an inner space;

a lower board coupled to an upper face of said lower housing, said lower board having one end extended parallel beyond said lower housing to form a terminal section and an upper face connected to one ends of brushes;

a magnet provided over said lower housing adjacent to an outer circumference of said lower board;

an upper board rotatably supported to a shaft connecting between central sections of said lower and upper housings, and integrally provided at a lower face with a commutator selectively contacting to said brushes for electric conduction;

a plurality of wound coils provided at an upper face of said upper board;

an insulator made of resin provided at the upper face of said upper board for integrally fixing said wound coils and said upper board;

a connector header provided in an outer face of said upper housing, and having terminals for applying external electric current to said terminal sections of the lower board; and a fixing bracket with a central section fixed in position inside said connector header and both ends bonded to the outer face of said upper housing via welding.

2. The vibration motor according to claim 1, wherein said connector header comprises a fixing rib projected from a lower portion of said connector header toward a bottom of said lower housing and provided at one end with a fitting protrude which is elastically inserted into a gap formed between said flange of the lower housing and the inner circumference of said upper housing.

3. The vibration motor according to claim 2, wherein said fixing rib is provided in plurality with an interval.

4. The vibration motor according to claim 1, wherein said fixing rib is integrally formed with said connector header via injection.

5. The vibration motor according to claim 1, wherein said fixing bracket is bonded to the outer face of said housing via spot welding.

6. The vibration motor according to claim 1, wherein said fixing bracket is made of sheet metal.

7. The vibration motor according to claim 1, wherein said connector header comprises:

a pair of bilaterally symmetric terminals with one ends electrically connected to said terminal section of the lower board and the other ends forming elastic inserting sections which are bent projectedly in one lateral direction after upwardly extended and contacts extended again from said inserting sections and circularly bent upward; and a body for fixedly receiving said pair of terminals therein, said body having inserting grooves for elastically receiving said inserting sections of the terminals and connecting grooves provided at upper portions for connecting between said inserting grooves and the outside to outwardly project said contacts of the terminals.

8. A coin-type vibration motor comprising:

a lower board having brushes and a terminal section;

a lower housing having a magnet attached to an upper face thereof;

a rotor having an upper housing for covering an upper portion of said lower housing, wound coils rotatably supported to a shaft connecting between central sections of said upper and lower housings to cooperate with said magnet, and a commutator for selectively contacting to said brushes;

a connector member provided at an outer face of said upper housing for applying external electric current to said terminal section of the lower board; and a fixing member for fixing said connector member to the outer face of said upper housing via bonding.

9. The coin-type vibration motor according to claim 8, wherein said connector member has a fixing rib projected from a lower portion of said connector member toward a bottom of said housing and provided at one end with a fitting protrude elastically inserted into a gap formed between an outer circumference of said lower housing and an inner circumference of said upper housing which are coupled with each other.

10. The coin-type vibration motor according to claim 9, wherein said fixing rib is provided in plurality with an interval.

11. The coin-type vibration motor according to claim 9, wherein said fixing rib is integrally formed with said connector member via injection.

12. The coin-type vibration motor according to claim 8, wherein said fixing member is bonded to an outer face of said upper housing via spot welding.

13. The coin-type vibration motor according to claim 8, wherein said fixing member is made of sheet metal.

14. The coin-type vibration motor according to claim 8, wherein said connector member comprises:

a pair of bilaterally symmetric terminals with one ends electrically connected to said terminal section of the lower board and the other ends forming elastic inserting sections which are bent projectedly in one lateral direction after upwardly extended and contacts extended again from said inserting sections and circularly bent upward; and a body for fixedly receiving said pair of terminals therein, said body having inserting grooves for elastically receiving said inserting sections of the terminals and connecting grooves provided at upper portions for connecting between said inserting grooves and the outside to outwardly project said contacts of the terminals.

* * * * *